(12) United States Patent
Pan

(10) Patent No.: US 9,992,648 B2
(45) Date of Patent: Jun. 5, 2018

(54) APPARATUS, METHOD AND SYSTEM FOR SUBSEQUENTLY CONNECTING PEOPLE

(76) Inventor: S. Sejo Pan, Atlantic Highlands, NJ (US)

(*) Notice: Subject to any disclaimer, the term of this patent is extended or adjusted under 35 U.S.C. 154(b) by 1566 days.

(21) Appl. No.: 12/739,735

(22) PCT Filed: Nov. 10, 2008

(86) PCT No.: PCT/US2008/083017
§ 371 (c)(1),
(2), (4) Date: Apr. 24, 2010

(87) PCT Pub. No.: WO2009/064694
PCT Pub. Date: May 22, 2009

(65) Prior Publication Data
US 2010/0262932 A1    Oct. 14, 2010

Related U.S. Application Data

(60) Provisional application No. 60/988,789, filed on Nov. 17, 2007.

(51) Int. Cl.
*H04W 4/20* (2018.01)
*G06Q 30/02* (2012.01)
(Continued)

(52) U.S. Cl.
CPC .............. *H04W 4/20* (2013.01); *G06Q 30/02* (2013.01); *H04L 67/18* (2013.01); *H04L 67/22* (2013.01);
(Continued)

(58) Field of Classification Search
CPC .. G06F 17/30241; H04L 51/14; H04L 67/306
(Continued)

(56) References Cited

U.S. PATENT DOCUMENTS 5,963,951 A * 10/1999 Collins
6,449,611 B1 * 9/2002 Frankel et al.
(Continued)

FOREIGN PATENT DOCUMENTS

EP      1434459 A2    6/2004
EP      1914677 A1 *  4/2008  ............. G06Q 30/00
(Continued)

OTHER PUBLICATIONS

Russell Beale, "Supporting Social Interaction with Smart Phones", 2005, IEEE.*

*Primary Examiner* — Justin S Lee
(74) *Attorney, Agent, or Firm* — IPR Works, LLC

(57) ABSTRACT

A method and system is provided for personally encountered users to subsequently identify one another and safely interact. Information of the encounter location description, or wirelessly obtained ID's in the encounter, along with a user's self-description that contains enough information for that user to be identified by other encountered users are transmitted to a system. The system displays to a user a collection of self-descriptions of other encountered users. From among the encountered users, a user can choose his target for further interactions in an unobtrusive and private way, including mutual intention inquiry, specific connection intention matching and unilateral interest expression.

4 Claims, 4 Drawing Sheets

(51) Int. Cl.
*H04W 4/02* (2018.01)
*H04W 4/18* (2009.01)
*H04L 29/08* (2006.01)

(52) U.S. Cl.
CPC .............. *H04L 67/306* (2013.01); *H04W 4/02* (2013.01); *H04W 4/023* (2013.01); *H04W 4/027* (2013.01); *H04W 4/18* (2013.01); *H04W 4/185* (2013.01)

(58) Field of Classification Search
USPC .................. 715/780; 709/224, 204; 707/1.02
See application file for complete search history.

(56) References Cited

U.S. PATENT DOCUMENTS

| | | | |
|---|---|---|---|
| 6,470,333 B1* | 10/2002 | Baclawski | |
| 6,922,689 B2* | 7/2005 | Shtivelman | |
| 7,027,823 B2* | 4/2006 | Mikuni | 455/457 |
| 7,072,892 B2* | 7/2006 | Hertz et al. | |
| 7,325,001 B2* | 1/2008 | Goldstein et al. | |
| 7,359,892 B2* | 4/2008 | Jokinen et al. | |
| 7,379,879 B1* | 5/2008 | Sloo | 705/325 |
| 7,592,910 B2* | 9/2009 | Tuck et al. | 340/539.13 |
| 7,669,123 B2* | 2/2010 | Zuckerberg et al. | 715/273 |
| 7,864,043 B2* | 1/2011 | Camp et al. | 340/539.13 |
| 7,899,862 B2* | 3/2011 | Appelman et al. | 709/204 |
| 7,907,755 B1* | 3/2011 | Perlmutter et al. | 382/118 |
| 7,958,066 B2* | 6/2011 | Pinckney et al. | 706/12 |
| 8,099,424 B2* | 1/2012 | Kenedy et al. | 707/759 |
| 8,108,778 B2* | 1/2012 | Athsani et al. | 715/738 |
| 8,161,419 B2* | 4/2012 | Palahnuk et al. | 715/781 |
| 2002/0116247 A1* | 8/2002 | Tucker et al. | 705/8 |
| 2002/0152035 A1* | 10/2002 | Perlin | 702/20 |
| 2002/0196342 A1* | 12/2002 | Walker et al. | 348/157 |
| 2004/0010608 A1* | 1/2004 | Piccionelli et al. | 709/229 |
| 2004/0148347 A1* | 7/2004 | Appelman et al. | 709/204 |
| 2005/0164675 A1* | 7/2005 | Tuulos et al. | 455/410 |
| 2005/0172001 A1* | 8/2005 | Zaner et al. | 709/205 |
| 2006/0015480 A1* | 1/2006 | Conahan et al. | 707/2 |
| 2006/0270419 A1* | 11/2006 | Crowley et al. | 455/456.2 |
| 2007/0027903 A1* | 2/2007 | Evans et al. | 707/102 |
| 2007/0282621 A1* | 12/2007 | Altman et al. | 705/1 |
| 2008/0168068 A1* | 7/2008 | Hutheesing | 707/10 |
| 2008/0238661 A1* | 10/2008 | Camp et al. | 340/539.21 |
| 2009/0037521 A1* | 2/2009 | Zilca et al. | 709/203 |
| 2009/0287783 A1* | 11/2009 | Beare et al. | 709/206 |
| 2010/0048167 A1* | 2/2010 | Chow et al. | 455/410 |
| 2010/0114614 A1* | 5/2010 | Sharpe | 705/5 |
| 2011/0302117 A1* | 12/2011 | Pinckney et al. | 706/12 |

FOREIGN PATENT DOCUMENTS

| | | |
|---|---|---|
| TW | I231907 | 5/2005 |
| TW | 200737916 A | 10/2007 |
| TW | 200743040 A | 11/2007 |
| WO | WO0229636 A1 | 4/2002 |

\* cited by examiner

APPARATUS, METHOD AND SYSTEM FOR SUBSEQUENTLY CONNECTING PEOPLE

CROSS-REFERENCE TO RELATED APPLICATIONS

This application claims the benefit of the U.S. Provisional Patent application 60/988,789 entitled "Apparatus, method and system for subsequently connecting people", filed on Nov. 17, 2007.

FIELD OF THE INVENTION

This invention relates generally to connecting people socially. In particular, aspects of this invention relate to methods and systems for subsequently connecting people who have already crossed paths.

BACKGROUND OF THE INVENTION

Sometimes we cross paths with someone interesting, but are not fortunate enough to establish a connection right away. We may be too shy to approach, thus letting the chance slip away, or the situation might have prevented us from establishing a connection before we are separated and lose the opportunity. In other cases we may want to remain relatively anonymous while still getting our admiration across to the target of our affection.

There have been ways to remedy these lost opportunities. Before the Internet era, there were "I saw you" personals in newspapers and local magazines. Today there are numerous web sites functioning as a posting platform for attempts to retroactively make a connection. An example is the "Missed Connection" section on CRAIGSLIST.ORG. These "missed connection" postings are different from personals or other search quests in that the person who posted it has already had an encounter with the targeted individual. It's either an "encountered-already, requesting-reconnection", or a "seen-already, inquiring-intention" process.

The success rate of these "missed connection" attempts is usually small. If the other person we are looking for is also looking for us, he would have to also go to the same platform, be it a magazine or one of the many social networking web sites, and search through all the postings to identify the time, place and scenario specific to his case. If the other person we are looking for is not looking for us—for example, he didn't know our interest in him when we met or he thinks the chance is too small to try—then reconnection is not possible.

In another aspect, sometimes without any specific sense of a missed connection, we would still like to know if we are the target of any search. Are any of the many individuals, noticed or unnoticed, we have passed in the course of our routine, seeking to reconnect with us? Going to all these platforms to search would be time-consuming and prone to misses. While these posted stories might be interesting to read, the chance of actually coming across one that is meant for us is small. Another shortcoming is, that these approaches lack any real time functionality. They are strictly retroactive solutions that can only be used afterwards. In the situation, for example, where we are still in the same restaurant (or any other location) with the target person, we could not use these solutions right there and then.

One of the objectives this invention provides, is a more efficient, effective, flexible, real-time and automated way to solve these problems. For an "active seeker" who has a specific connecting target in an encounter, this invention provides a way to remedy the regret and a second chance to connect; for a "silent seeker" who has a specific connecting target but doesn't want to expose himself, at least in the beginning, this invention provides a way to anonymously and indirectly express his interests towards his connecting target; for a "passive seeker" who doesn't have a specific connecting target, this invention provides a way for him to know if he is admired or sought for by others.

SUMMARY OF THE INVENTION

The apparatus, system and method of this invention provide a mechanism for people to subsequently connect to other people with whom they have crossed paths, either after they have parted or while still in their presence. Users of the apparatus and system of this invention can actively seek to connect or passively seek to be connected to other users. Users can also express admiration or other intentions towards other people, or can discover such attempts from other users, all in a more automatic, efficient, effective, real-time and flexible way.

Definitions

Spacetime: The overall single construct that combines space and time description.

Event: A description of a certain location at a certain time. It generally includes a location description and a time description. Practically, altitude of the location can often be omitted without losing the ability to locate a place. For example, if you are at Washington Square, NYC, you can be assumed to be 'on' the Square, not in a blimp in the air above the Square. An event could be expressed in geographical coordinates plus time, or an address plus time, or any description that practically identifies a particular location at a particular time, in a direct or indirect way. In this invention, an event is used to describe a user's whereabouts so the matching system knows where the user is in spacetime, either by the description itself or relative to other events. The resolution, or error range, in space and time could also be included in the event. In other words, an event could be a "point" or a "blob" in spacetime covering a stretch of time and a stretch of space. As long as it can be described sufficiently for the matching system to function, an event doesn't have to have a fixed spacetime resolution.

Encounter: An encounter means two or more people having correlated events, that is, events that are either overlapped or neighboring in spacetime. When two users encounter one another, their events correlate, and they are essentially at the same place at the same time, at least, after considering the resolution of space and time of the event information and general human eye sight range, it's possible they could see each other. A threshold, or a set of thresholds can be used for determining if two time descriptions, or two location descriptions, or any combination of the dimensions in the events are correlated.

Personal Traits: Information about characteristics of a person, including steady personal traits and transient personal traits. Sex, race, skin color, eye color, height, weight are examples of steady personal traits, which tend not to change, or at least not very often. Clothing and accessories worn by a person are examples of transient personal traits which tend to change with events. Personal traits description could be in the form of written descriptions, pictures or other multimedia formats. Personal traits are used in this invention, along with other encounter information, to help describe or identify a particular person.

Connecting Target: The person to whom a given user of the matching system would like to connect. A connecting target could be specific or non-specific. For example, a passive seeker typically would not have a targeted individual in mind, but in consideration of symmetry, we still use "connecting target" to refer to any possible target that a passive seeker is open to be connected to.

Event-dependent Information: Information about the environment, the situation, or the interactions of the encountered parties, specific to an event of encounter. For example, "I was with a group of friends", "You were alone", "We noticed each other but didn't speak", "I noticed you but you didn't notice me", "The rain stopped when we were parting". Event-dependent information is an objective description of reality about an event in an encounter. It can be used to further confirm other encounter information, and function as an "a priori" filter of the connecting target (as opposed to the users using verifications to interactively confirm).

Intention Indicator: A specific intention a given user has for his connecting target. The act of a user sending a matching request to the matching system actually has already implied some kind of implicit intention—either being "interested" in someone he has crossed paths with, or wanting to know if there could be some kind of connection between himself and people who noticed him. The additional use of an intention indicator can function as a clearer expression, or cancellation, of this implicit intention. For example, an active seeker can use the intention indicator to specify whether he is seeking romance or friendship; a passive seeker who only provides his spacetime trajectory can use the intention indicator to express that he's only interest in matches that intend friendship, or express that he doesn't want any actual connections—only the satisfaction from knowing that there are people interested in him. An intention indicator can be implemented as an even clearer description: for example, "Romance: opposite sex only", "Friendship: same sex only", etc. Thus, an intention indicator can practically function as a filter in the matching process too. Different from objective descriptions of an encounter, like event-dependent information, an intention indicator is an expression of a subjective intention of the user himself and provides a mechanism to matching individual intentions in the matching process.

Encounter Information: All or part of the information associated with and identifying an encounter, including event, personal traits of self, personal traits of the connecting target, event-dependent information and intention indicator.

Verification Question: A question about encounter information for a connecting target, wherein the answer is likely known only between the parties of the encounter. A matching request could omit some encounter information and request answers to these questions from the other party. Verification questions can be used to narrow down or confirm the target person and exclude other irrelevant people. Examples are: "What color shirt were you wearing?", "What music was playing when we exchanged a smile?"

Subsequently Connecting: Subsequently connecting means either retroactively connecting people who had previously crossed paths and parted, or connecting people after they have seen each other, but prior to parting.

DETAILED DESCRIPTION OF THE INVENTION

Figure 1:
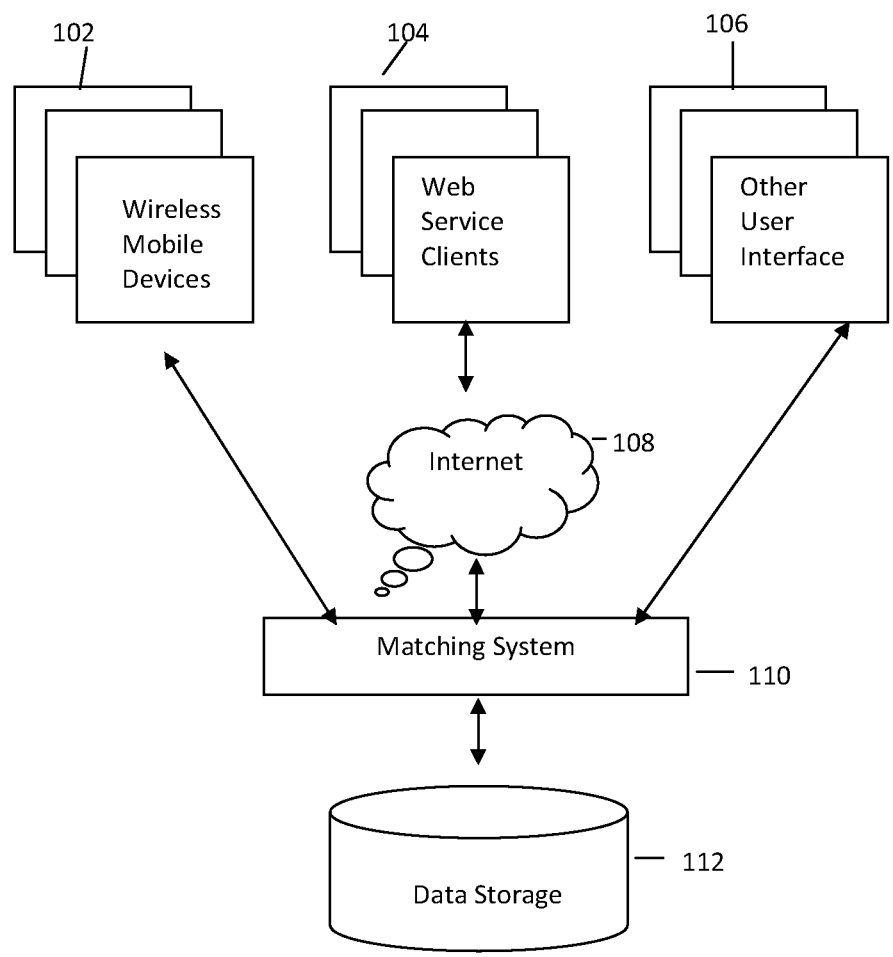
FIG. 1 illustrates an embodiment of the matching system 110, which stores received data in a data storage 112, interfacing with wireless mobile devices 102, web services 104 and other user interfaces 106. The interfacing communications is either direct access or through the Internet 108.

We cross paths and part. Sometimes, we are able to connect at the moment, sometimes we are left with regret or unexpressed feelings regarding the missed opportunity. One of the objectives of this invention aims to fulfill the human need to subsequently process these feelings or intentions—in other words, to link with the other person, whether still present or long since gone. The target of subsequent connection could be specific or non-specific. Sometimes we want to actually find and get in contact with a particular person from a missed connection. Sometimes we want to express admiration or other intentions in a relatively anonymous way towards a specific person from an encounter and may or may not wish to be connected with the target right away. Sometimes we want to find out if there are any as yet unexpressed intentions towards ourselves from the numerous encounters along the course of our daily lives.

To subsequently connect people from a previous encounter, a centralized system or platform, hereafter referred to as the "matching system", is used to take encounter information from users, match them or find possible matches, perform further verification, notify users if there is a match or possible matches, and act as a medium for communications. The inputs to the matching system can come from a variety of sources in various formats. The matching system could also be a distributed system, instead of a single standalone system.

Personal wireless mobile devices can be location-aware and time-aware—for example, GPS-equipped devices like cell phones, PDA's and mobile computers. Whether using satellite positioning, cell phone tower positioning or other methods, the user of these devices could obtain an event, or a series of events either continuously or continually. For example, at a particular moment with a press of a button the user could obtain the current event or have the event recorded by the device (a single event); or the user could have his personal mobile device track his events over a period of time (a series of events) so that a particular event in the past could be retrieved. The events could be stored in the device itself or in the system of the wireless communications service provider. The personal mobile device could also guide and navigate the user to modify or retrieve the desired event or events—for example, let the user obtain the current location but modify the time, or retrieve certain events from the recorded spacetime trajectory. Other than obtaining events externally, the device could also obtain events from the user's input—for example, navigating the user on an interactive map to pin down a location, or using the user's spacetime description to generate event information. The user could have his personal traits, or profile, stored in the device. The device could also let the user input personal traits description of the connecting target, event-dependent information, intention indicator, or verification questions. All or parts of these pieces of information constitute the encounter information. The device could transmit the encounter information as a matching request, at the user's control, to the matching system, or it could generate the encounter information in a portable format for the user's discretionary use later, for example, uploading, transferring, emailing to the matching system.

Besides using a location-aware personal wireless mobile device, there are yet other ways to get the encounter information into the matching system. An embodiment example is using a web-based service as the interface between the matching system and the user. The web-based service could guide the user on an interactive map to locate an event or a series of events, or take the user's input in all formats like address, landmarks or other spacetime descriptions to generate events. A user could have an account to store personal traits, contact information, or enter them per-request. A user could also enter other encounter information. A user could also upload encounter information from another device to the web services. The web services could also be accessed from another computer or device too (for example, a wireless mobile device that is Internet-capable). Other embodiments include using email, file uploading, or various Internet data exchange protocols to get the request and encounter information into the system. These permutations of possibilities are merely design choices.

The matching system interprets a received encounter information as a request for matching, performs matching, and provides the matching results to the users. A matching request must minimally contain event information (a single event or a series of events), but doesn't have to have a specific connecting target or other encounter information. For two matching requests to be matched, they have to at least have correlated events, that is, overlapped or neighboring events, which means the users of the events are essentially at the same place at the same time. Correlation of two events can be determined, for example, by comparing the difference metric in each dimension of the events to a respective threshold, or comparing the time difference to a time threshold and the location difference to a two or three-dimensional distance threshold, or calculating the distance difference of the events in the overall spacetime construct and comparing it to a spacetime threshold. The resolution of the event information and the usual human eyesight can be taken into account in determining the thresholds, since when two users encounter, they are assumed to be close enough in spacetime so that they are able to see each other. A match is based on events. For example, if one matching request contains a series of events and another contains a single event, when they match, they match at that single event. When a pair of events match and both parties provide other corresponding encounter information, the other encounter information can additionally be used to determine if the two matching requests match as a whole.

If a matching request contains only a single event, all other encounter information in the request correspond to this event. If a matching request contains a series of events, the other encounter information in the request can be assumed to be associated with all the events. For example, if a passive seeker's request contains a series of events and a personal traits description of himself, the traits description covers all the events in the request. In the case of more complicated embodiments, the user can relate specific information to specific events. With the same example of a passive seeker's request containing a series of events, the request could have a personal traits description corresponding to the first half of the events, and another corresponding to the second half of the events. For example, in the first event segment, it was raining and a yellow rain coat was worn; in the second segment it was sunny and a green shirt was worn. In another example, although a passive seeker usually doesn't have a particular connecting target, he could also be allowed to include a personal traits description of a particular connecting target person for a particular event in the event series he provides (that is, for that particular event, he is an active seeker, but for all other events he is still a passive seeker). Of course any of the above complicated matching requests could also be separated into two matching requests and each achieves the same functional matching result.

A matching result can be one-sided or mutual. A request describing only the personal traits of the connecting target, when matched with another request describing only the personal traits of its user himself, is a match from the system's point of view. However, from the view of the users, it's a "one-sided" match. A match between an active seeker and a passive seeker could also be a one-sided match too. When each user describes himself and the connecting target, and both the descriptions match, it's a "mutual" match. The matching system could convey the matching result along with whether it's a one-sided or mutual match to the users.

Regarding which information in a matching request is practically necessary and which is optional, first consider an extreme example: two users are alone together in an empty field with no other people and both want to confirm if the other has some kind of shared interest. If each sends a matching request containing only his own event to the system, and gets a positive matching result, some kind of mutual interest is confirmed and it's much easier to start the first words without risking possible rejection. If each user clearly knows what he wants, and includes an intention indicator, with one indicator being "Let's try to talk" and the other "Your place or mine?", there is no match. Still, the awkwardness of negotiating the purpose of the encounter in words is avoided and the result is quickly achieved. Consider another example: there are more than these two users in the area. However, if one of the users can be easily described—for example, the only Asian; the only female or the only blond—then a matching request with the event plus a simple personal description will suffice. Consider a complicated situation in a subway car in Tokyo in peak hours. Describing oneself and the connecting target by personal traits becomes no easy task. Adding event-dependent information about the personal interaction facts could then serve as a helpful identifier and a filter. Verification questions serve the same practical purposes, but the asking and answering have to involve multiple steps in an interactive process between the users.

Figure 2A:
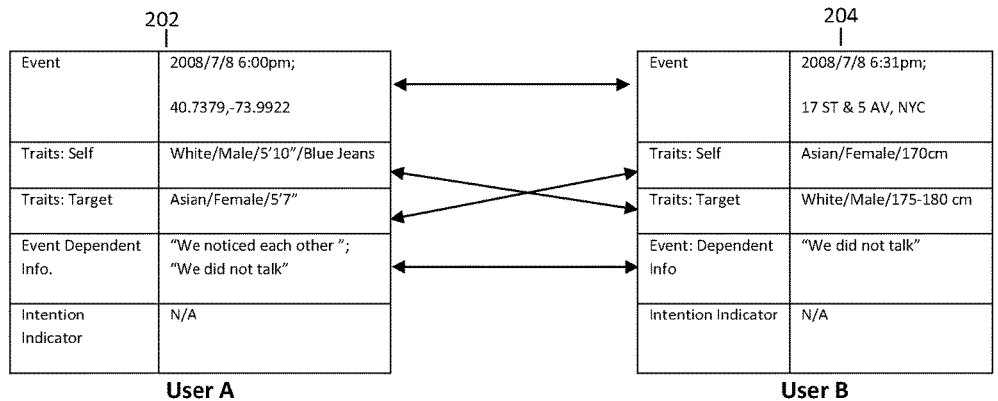
FIG. 2a illustrates an example of matched matching requests from two active seekers seeking for each other. User A's matching request 202 is compared with user B's matching request 204.
Figure 2B:
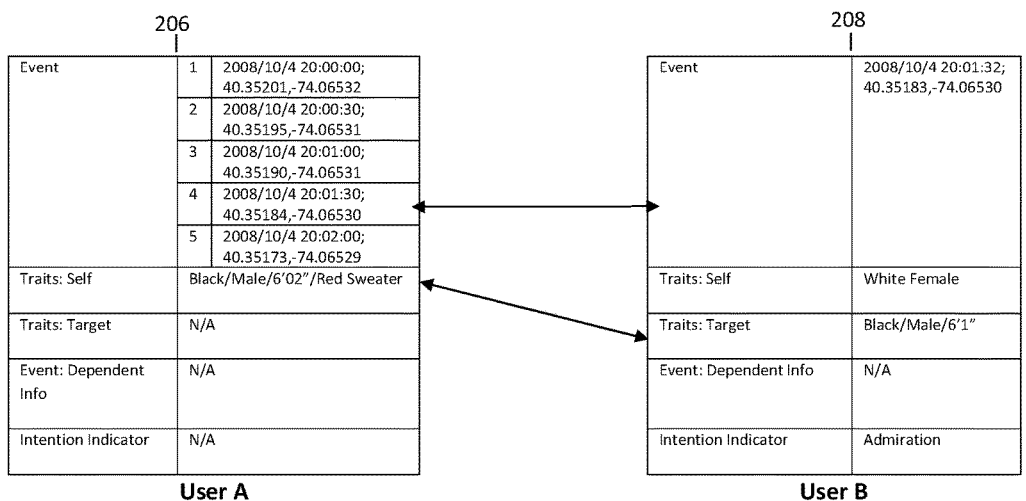
FIG. 2b illustrates an example of a matching request 206 containing a series of events from a passive seeker (user A) being matched with a matching request 208 from an active seeker (user B).
Figure 2C:
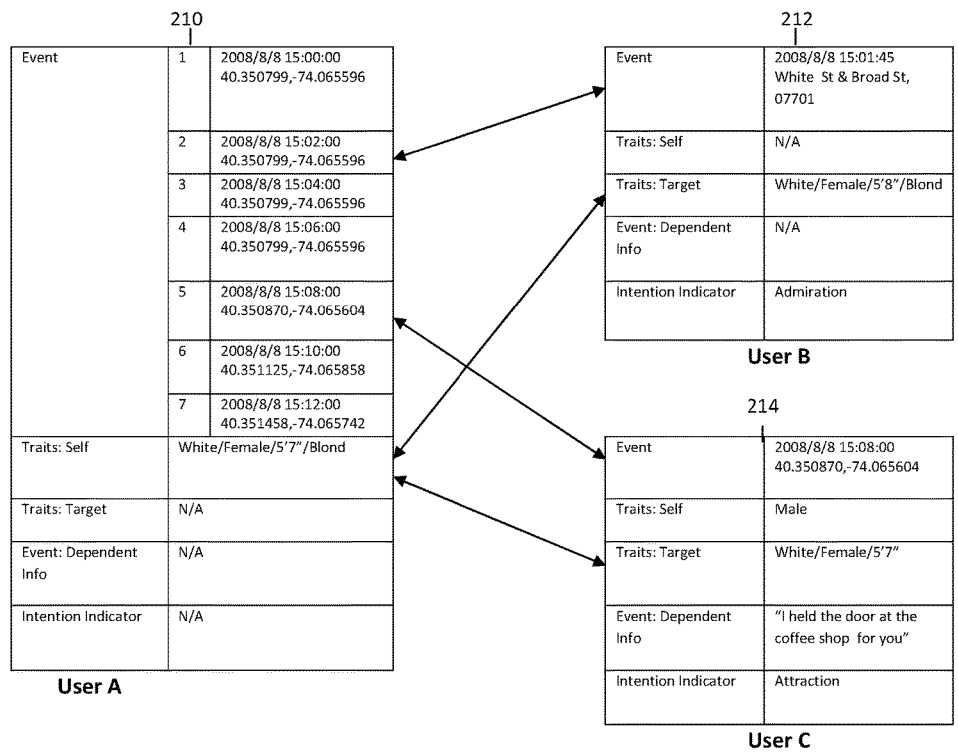
FIG. 2c illustrates an example of a matching request 210 from a passive seeker (user A) containing a series of events, being matched with a matching request 212 from a silent seeker (user B) and a matching request 214 from an active seeker (user C).

For any given matching request, the matching system might produce a one-to-one match (e.g., two active seekers seeking each other), a many-to-one match (e.g., multiple people might match a user's description of his connecting target), or a one-to-many match (e.g., a heartthrob having multiple admirers). FIG. 2c is an example of a passive seeker's (user A) matching request being matched with a silent seeker (user B) and an active seeker (user C).

The feed to the matching system could be in a particular normalized format, or the matching system could convert any format into whatever internal representation it deems most efficient for searching, sorting and matching. Matching could be fuzzy or best-effort, using heuristically, reasonable assumptions of event resolution and encounter information. Event information from different users could vary in resolution or data precision in the first place. A set of GPS coordinates could be more precise than coordinates obtained by a user's address-to-location translation. All these can be taken into consideration. For example, 3:30 PM provided by a user could mean anywhere between 3:25 and 3:35 PM; at the same time, a user at $17^{th}$ St. and 7th Ave. could be neighboring another user at $18^{th}$ St. and $7^{th}$ Ave since considering the location resolution and human eyesight they could be able to see each other; user's estimations of height and weight of others could be less than precise; when clothing color is described as black, it could actually be dark blue, etc. Besides the system employing reasonable thresholds in calculating a match of two pieces of information, the user could also specify the desired or acceptable error range in each dimension in the match (i.e., how the error range of the data should be interpreted when used in determining a match), or adjust them interactively with the matching system. Particularly for potentially complicated encounter information elements like event-dependent information, the system could limit the user's input to a list of possibilities like "We didn't talk", "We talked", "We noticed each other", "I noticed you but you didn't notice me". Also, the system could allow the user to participate in resolving ambiguities interactively. For example, asking the user "You entered 3:30 PM, but there is another quest at 3:25 PM that seems to match. Are you sure it couldn't have been 3:25 PM?", "You entered black shirt. Could it be dark blue?" Alternatively, the system could also just convey all possible matches to the user and let the user judge for himself. As the users have lived or are living the events, judging is usually not difficult. A matching result doesn't have to be either "match" or "no match". It could also contain a "confidence of matching" instead. Confidence of matching could be an over-all consideration of the request, or specific to particular encounter information in the request.

Figure 3A:
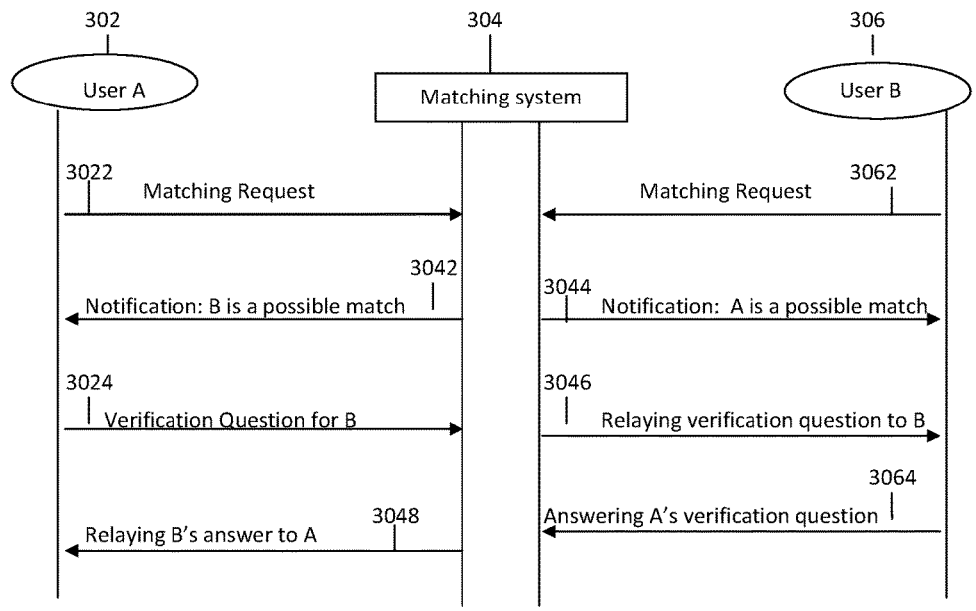
FIG. 3a is an example of information flow sequences between user A 302 and user B 306 via the matching system 304. Users A and B each sends a matching request to the system (3022 and 3062 respectively); the system notifies each user that the other is a possible match with notification 3042 for user A and notification 3044 for user B; user A then further uses a verification question 3024, which is relayed by the system to user B, to confirm if B is his connecting target. User B receives that relayed verification question 3046 and responses with an answer 3064, which is relayed by the system as an answer 3048 to user A.
Figure 3B:
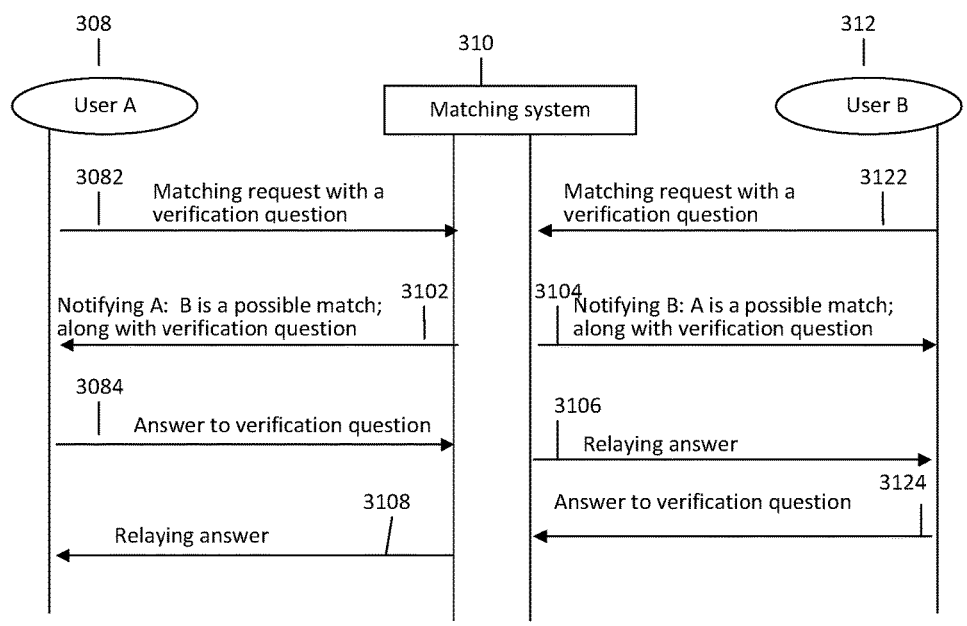
FIG. 3b is an example of information flow sequences between user A 308 and user B 312 via the matching system 310. Users A and B each sends a matching request with a verification question (3082 and 3122 respectively) to the system; the system notifies each user that the other is a possible match, along with the verification question from the other (3102 sent to user A and 3104 sent to user B); both users then exchange the answer to each other's verification question via the system. User A answers to the system with answer 3084, which is relayed to user B as answer 3106. User B answers to the system with answer 3124, which is relayed to user B as answer 3108.

Consider the scenario of active seekers. At a train station, a user has a brief encounter with another person. Before they are able to exchange contact information, a train takes him away. The user regrets letting the chance slip away and wishes to reconnect with him. The user, now the active seeker, could use his mobile device right there and then to capture the event; or he could later retrieve the event from his mobile device if it's configured to keep track of his spacetime trajectory; or he could retrieve the event from the service provider of his mobile communications if he has such a service subscription. In addition to the event, he supplies other encounter information like his own personal traits, a description of the personal traits of his target, event-dependent facts, intention indicator, verification questions, etc, and have it all sent to the matching system. Suppose the other person also does the same. The matching system might send each user a verification question from the other party, like, "At which platform did we part?" or "What was the color of the coat you were wearing?" so that the match can be confirmed. The matched users could thereafter reconnect with each other via the matching system. FIGS. 3a and 3b are two examples of information flow sequences between two users with verification questions.

Consider the scenario of silent seekers. The silent seeker, like the active seeker, wants to convey some intention or opinion to a target, but he chooses to remain relatively anonymous, at least initially. A silent seeker would use the same means as an active seeker to send an encounter information to the matching system except he could hold back some of his personal traits or event-dependent information so that he is not readily identifiable to the target. The matching system could do a best-effort match. The matching system could notify the possible matches, in one example, that they have a secret admirer. The target person could choose to be linked with this silent seeker, or acknowledge the silent seeker, or ask verification questions to confirm first, all via the matching system. FIG. 2c contains an example of a matching request from a silent seeker (user B) being matched with a request from a passive seeker (user A). A silent seeker is not necessarily a secret admirer. He could specify his intentions using an intention indicator, which could range from admiration to amicable interests or support, or even negative feelings.

Consider the scenario of passive seekers. There could be times that the "missed connection" is only considered such by one party: the active seeker or the silent seeker. However, the other party, or just anyone who is curious to know if he was himself being sought even though he is not pro-actively seeking to remedy any missed connection, could still request possible matches. This is the passive seeker. A passive seeker could have his mobile device track his spacetime trajectory and feed all or part of it to the matching system. With the same principles discussed above, he could edit the events on his mobile device or obtain events from his service provider. He could have a series of events transmitted directly to the matching system or obtain it in a portable format for his own use to enter into the matching system. Along with the events he could have his personal traits description or other particulars of the events fed into the matching system. For example, he carries his mobile device and has it track his events all day. At the end of the day he comes home, wondering if he crossed paths with anyone having friendly intentions towards him. He could take his spacetime trajectory of the day, either recorded on his mobile device or obtained from his service provider, choose all or part of it, choose to supply his personal traits descriptions, dress color, style, body jewelry of the day, etc, and have this information directly or indirectly sent to the matching system. It could be as simple as pressing a button on his mobile device and entering the color of his clothing today, if he already has other fixed personal traits stored. The matching system tells him if there were possible matches of active seekers or silent seekers as well as the specifics of the encounter information of the matches or possible matches. He could match the results with his memory of people and encounters of the day and decide if he wants to pursue further, or just feel satisfied. He could communicate with the other parties via the matching system, for example, using verification questions to either make sure he was indeed the target, or narrow down who they possibly were. If he knows who they were by associating the encounter matches with his memory, he could choose to have the matching system link him with the other party for direct communication, or acknowledge them, or just ignore them and be satisfied that he is popular. FIGS. 2b and 2c are examples of a passive seeker (user A in both figures), whose requests are matched with requests from other kind of users.

A passive seeker may not have a particular person as his connecting target, but still, he could limit what kind of people he wants to be matched to. He could use a general description to describe targets he is open to being connected to—for example, sex or age group, or use an intention indicator so that he is matched with users of a particular intention. He could limit matches provided by the system to only users fulfilling these descriptions. For example, a popular person that gets too many matches could narrow down his social interaction caused by using the matching system this way.

One of the features of this invention is the real time or near real time functionality. A user could turn on event-tracking on his wireless mobile device and have his events transmitted to the matching system, along with other encounter information like person traits, while receiving matching notifications from the matching system, continuously or at intervals. This is referred to as the real time update. Besides updating the matching system with real time events, a user could also dynamically update the matching system with other encounter information, for example, his current apparels description, or a current picture of himself. For example, in a coffee shop, an active or silent seeker could transmit an encounter information to the matching system while still living the same event with his target. Suppose the target person is a passive seeker and has his event tracking and real time update turned on, he would be notified of his active or silent seeker in real time. The passive seeker could make a decision then whether to act on it right there and then. If he looks around and sees no one he could be interested in, he could ignore the match notification. From the aspect of the users, the real time functionality, with the matching system as the medium, provides a buffer in real time social interactions. For the active seeker, even if his interest is not matched with or returned by his target, it is unnoticed and there is no awkwardness. Additionally, since the matching system has the events of a pair of matched users, the matching system knows the distance between the users. With real time updates, the system also knows the real time distance changes between the users. The system could provide the distance or distance changes to matched users. This information, together with the actual positions or movement of people in reality, provides useful information for a user to further narrow down or confirm which other user he is seeing is the one in the match.

Notification of matches could be automatic. The user doesn't necessarily have to go to the matching system to check all the time. The matching system could send the matches or possible matches, or further verification questions directly to a user's mobile device, email, phone, service account, etc. A user could interact with the system to adjust the matching threshold of space, time, and other encounter information situationally. A user can broaden an unmatched request and ask the system to perform the match again, or narrow down a request that turned out too many matches.

Nearby wireless devices ID's can be helpful information in matching. Devices usually have a unique identity of their own—for example, serial number. A wireless device could be configured "discoverable" so that its ID can be scanned by other wireless devices nearby. For a given time, these nearby wireless device ID's can function as a relative location description corresponding to that time, to determine if two events are correlated. For example, a matching request from user A and a matching request from user B have matched time, but neither has direct location description of that time. If A's request includes B's wireless device ID and vice versa, or they both include the ID of another device C, the system can determine that A and B were at the same place at that time, although the actual place is not known. They could have been in a subway car or in a basement where GPS service was not available. Nearby wireless device ID's could be used to supplement, or used in lieu of, the location information of the event in a matching request. Nearby wireless device ID's sometimes could provide more precision in determining if two events are correlated compared with using GPS data, as some wireless communication protocols have very short communications range. Nearby wireless device ID's can also be used as event-dependent information, as it also objectively describes the environment/situation of an encounter.

Preciseness in matching is understood to be reality driven. For example, if a user gives a very finely tuned description of event (a set of GPS coordinates plus time for example), a detailed description of personal traits of himself and the target, and detailed event-dependent information, the chance of someone else other than his target person sharing the same event and fitting all the encounter information is practically small. If the detected nearby wireless device information is taken into account, the chance of error is even smaller. As the user lives or has lived the event, he has additional information to supplement and discern the matching results. He could even specify the desired threshold used in determining the match to best suit a particular encounter. For example, if a user remembers that at the encounter, there was no one else but his connecting target, or that his connecting target was the only female person there and then, when he is notified that his request has a match, he is actually more certain than the system. The matching system could perform the matching in best-effort or with user determined rules. Nonetheless, for the matching system, one match could be more precise than another. The user could be notified with the confidence level of a match, or be notified with all the possible matches and judge on his own based on the situation or his memories. From another aspect, the fact that sometimes a match could be somewhat uncertain, whether it is caused by the data precision itself or user's purposed manipulation of the encounter information, also has a practical functionality: it provides an obscure buffer zone and therefore a sense of safety that many users need. Moreover, sometimes knowing that "possibly so many people are interested in me" is better than knowing "no one is interested in me".

The communications service providers of the wireless mobile devices could also provide additional services besides furnishing event information at the user's agreement or request. They could provide certification on personal profile or traits; they could provide information encryption or security certification for information passing; they could provide monitoring on the matches and user interactions to offer additional safety for users.

The matching results from the matching system do not have to be available only to the parties of concern or only between the possible matches. The matching requests or matching results could be available multilaterally as a shared interaction of a user community. A user could see if his target is also a target of other users, and what other targets those users have, or if his target has a different target, etc. The matching system could connect users in such a second order, third order, or beyond. In some embodiments, a user could use a web-based interface to browse these other users of second degree or beyond. A user could choose and change how visible or identifiable he is in this collective community of users. A user could choose whether or not to make his intention towards his target "visible" to other users.

The events of users collectively could also function as a useful "community activity indicator" to the users of the matching system. A user could decide and change whether or not to permit his current, past, or even future events, as well as his personal traits or other information, to be revealed to other users. He could choose to make such information available in whole or in part, to all other users, to a select group, or to all but some blocked users, and he could dynamically revise that information to reveal more or less broadly at will. He could also advertise his scheduled events in the future in the same manner. In such a way, the matching system could let a user know where other users are, have been, or will be, along with other descriptive information. For example, a user could use his mobile device or a web-based interface to see, search, or be notified where certain types of users he might be interested are, have been or will be. A user could also search or be notified about the events of a particular target user. It is possible to specify a particular user if along with a previous match or possible match, the mobile device ID, the website user ID, IP address, etc, is revealed to the other party. As the match is based on what they observed about one another at an event, a user does not have to know another user or have another user's cell phone number or name, etc, to do this. A user could choose to not disclose these ID's or block his information to a specific user.

The various embodiments described above are presented as examples of the invention, not limitations. It will be apparent to persons skilled in the arts that various modifications and permutations can be made therein without departing from the spirit and scope of this invention.

I claim:

1. A method for facilitating a mobile communications device user to gracefully inquire mutual desire to interact with one or more other users encountered in proximity, the method comprising:
   obtaining an encounter inquiry from each user, wherein the encounter inquiry from a particular user represents an inquiry about other encountered users that are either overlapped or neighboring in spacetime with said particular user, said encounter inquiry comprises:
   (1) a profile of said particular user, wherein said profile comprises descriptive information of and supplied by said particular user or an identifier based on which said descriptive information can be separately retrieved such that said particular user can be identified through said profile by other encountered users; and
   (2) encounter information comprising at least one of the following:
      (a) a geographical description of the location of the encounter;
      (b) an ID uniquely associated with another user in the encounter, said ID wirelessly obtained by said particular user's mobile device scanning said another user's mobile device; or
      (c) an ID uniquely associated with a wireless device in the proximity that can serve as a location reference of the encounter;
   using the encounter information from said encounter inquiry of said particular user, calculating and displaying a discovery result to said particular user, said discovery result comprising the profiles of other encountered users;
   receiving a connection request from a first user deeming to connect to a second user with a profile chosen by the first user from among the discovery result displayed to the first user;
   and either
   (1) discarding or blocking said connection request from the first user deeming to connect to the second user so that the second user is not aware of said connection request if the connection request from the second user deeming to connect to the first user is not received; or
   (2) notifying the first user and the second user that there is a mutual desire to connect if and only if the connection request from the first user deeming to connect to the second user and the connection request from the second user deeming to connect to the first user are received.

2. An encounter matching system for facilitating a mobile communications device user to gracefully inquire mutual desire to interact with one or more other users encountered in proximity, said system comprising:
   a computer system;
   means for the encounter matching system obtaining an encounter inquiry from each user, wherein the encounter inquiry from a particular user represents an inquiry about other encountered users that are either overlapped or neighboring in spacetime with said particular user, said encounter inquiry comprises:
   (1) a profile of said particular user, wherein said profile comprises descriptive information of and supplied by said particular user or an identifier based on which said descriptive information can be separately retrieved such that said particular user can be identified through said profile by other encountered users; and
   (2) encounter information comprising at least one of the following:
      (a) a geographical description of the location of the encounter;
      (b) an ID uniquely associated with another user in the encounter, said ID wirelessly obtained by said particular user's mobile device scanning said another user's mobile device; or
      (c) an ID uniquely associated with a wireless device in the proximity that can serve as a location reference of the encounter;
   means for the encounter matching system, using the encounter information from said encounter inquiry of said particular user, calculating and displaying a discovery result to said particular user, said discovery result comprising the profiles of other encountered users;
   means for the encounter matching system receiving a connection request from a first user deeming to connect to a second user with a profile chosen by the first user from among the discovery result displayed to the first user; and means for the encounter matching system either (1) discarding or blocking said connection request from the first user deeming to connect to the second user such that the second user is not aware of said connection request if the connection request from the second user deeming to connect to the first user is not received; or (2) notifying the first user and the second user that there is a mutual desire to connect if and only if the connection request from the first user deeming to connect to the second user and the connection request from the second user deeming to connect to the first user are received.

3. A wireless mobile device (WMD) for facilitating its user to gracefully inquire mutual desire to interact with one or more other WMD users encountered in proximity through an encounter matching system, said WMD comprising:

a communication unit capable of transmitting and receiving wireless signals;

means for the WMD transmitting an encounter inquiry to said encounter matching system, said encounter inquiry represents an inquiry about other encountered users that are either overlapped or neighboring in spacetime with its user, and said encounter inquiry comprises:

(1) a profile of its user, wherein said profile comprises descriptive information of and supplied by its user or an identifier based on which said descriptive information can be separately retrieved such that its user can be identified through said profile by other encountered users; and (2) encounter information comprising at least one of the following:

(a) a geographical description of the location of the encounter;

(b) an ID uniquely associated with another user in the encounter, said ID wirelessly obtained by the WMD scanning said another user's WMD; or (c) an ID uniquely associated with a wireless device in the proximity that can serve as a location reference of the encounter;

means for the WMD obtaining, as a response from the encounter matching system to said encounter inquiry, a discovery result comprising the profiles of other encountered users;

means for the WMD transmitting a connection request to the encounter matching system indicating a desire to connect to a second user, said second user chosen by the user of the WMD from among said discovery result; and means for the WMD either (1) blocking connection requests from all users relayed by the encounter matching system from reaching the user of said WMD except from one with whom the user of said WMD is also trying to connect; or (2) receiving connection requests from other users relayed by the encounter matching system and notifying its user of a certain connection request from a certain other user only when its user has made the connection request indicating a desire to connect to said certain other user.

4. A method for a wireless mobile device (WMD) to facilitate its user to gracefully inquire mutual desire to interact with one or more other WMD users encountered in proximity through an encounter matching system, said method comprises:

transmitting an encounter inquiry to the encounter matching system, said encounter inquiry represents an inquiry about other encountered users that are either overlapped or neighboring in spacetime with its user, and said encounter inquiry comprises:

(1) a profile of its user, wherein said profile comprises descriptive information of and supplied by its user or an identifier based on which said descriptive information can be separately retrieved such that its user can he identified through said profile by other encountered users; and (2) encounter information comprising at least one of the following:

(a) a geographical description of the location of the encounter;

(b) an ID uniquely associated with another user in the encounter, said ID wirelessly obtained by the WMD scanning said another user's WMD; or (c) an ID uniquely associated with a wireless device in the proximity that can serve as a location reference of the encounter;

obtaining, as a response from said encounter matching system to said encounter inquiry, a discovery result comprising the profiles of other encountered users;

transmitting a connection request to the encounter matching system indicating a desire to connect to a second user, said second user chosen by the user of the WMD from among said discovery result; and either (1) blocking connection requests from all users relayed by the encounter matching system from reaching its user except from a user with whom its user is also trying to connect; or (2) receiving connection requests from other users relayed by the encounter matching system and notifying its user of a certain connection request from a certain other user only when its user has made the connection request indicating a desire to connect to said certain other user.

* * * * *